Patented Aug. 4, 1925.

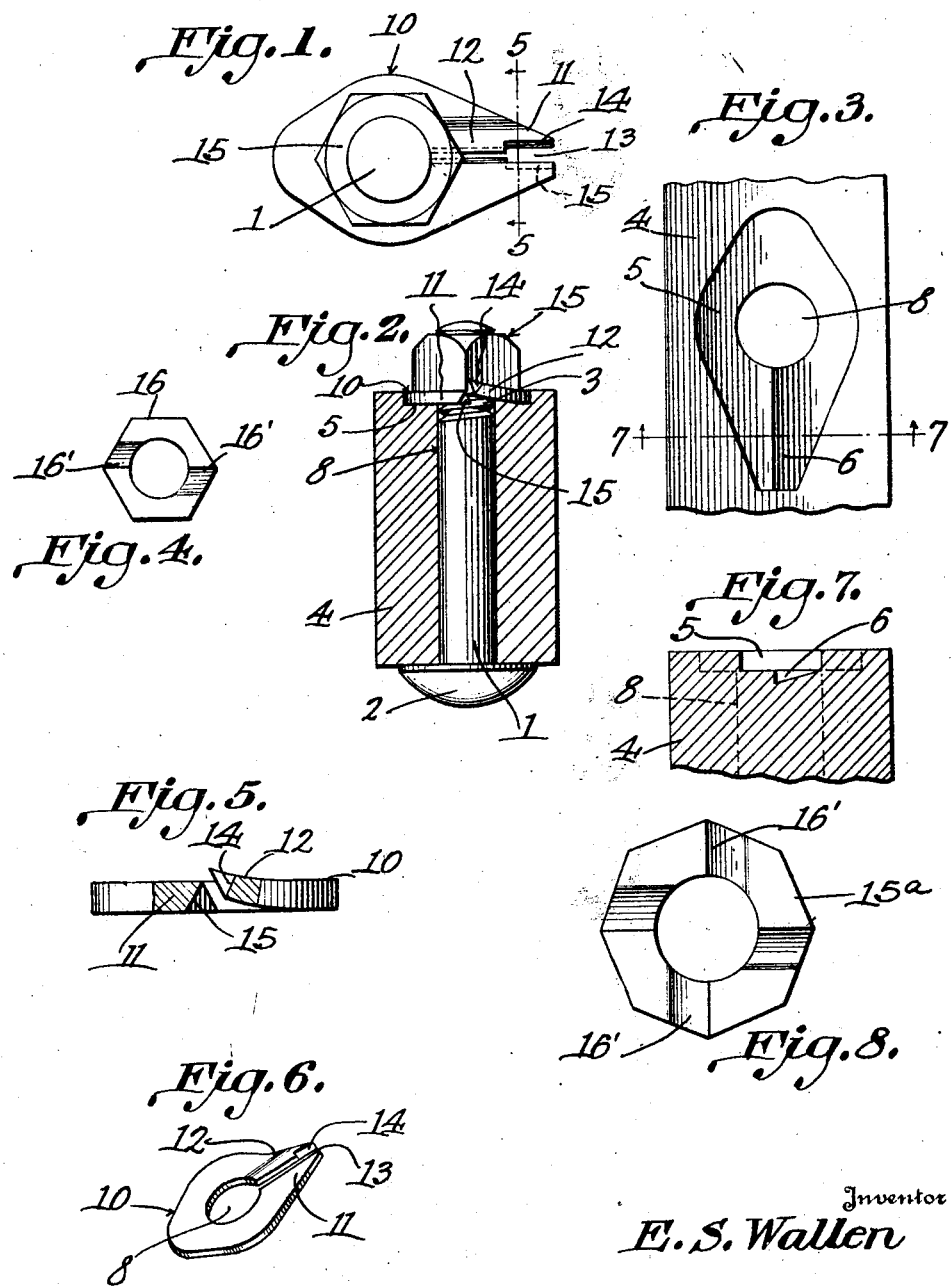

1,548,076

UNITED STATES PATENT OFFICE.

ED S. WALLEN, OF FAIRLAND, OKLAHOMA.

NUT LOCK.

Application filed April 20, 1925. Serial No. 24,522.

*To all whom it may concern:*

Be it known that I, ED S. WALLEN, a citizen of the United States, residing at Fairland, in the county of Ottawa and State of Oklahoma, have invented a new and useful Nut Lock, of which the following is a specification.

This invention relates to nut locks of the ratchet type.

The object of the invention is to provide a nut lock in which the threads of the screw or bolt are not in any way affected and yet will reliably secure the nut on the bolt.

Another object is to provide a simple and efficient lock of this character which while securely holding the nut connected with the bolt may be readily released when desired.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a top plan view of the nut lock constituting this invention;

Fig. 2 is a vertical section through a piece of timber with the bolt shown mounted therein and this improved lock applied, the bolt and lock being shown in side elevation;

Fig. 3 is a plan view of the object in connection with which the bolt is to be used showing the counter sunk teeth to receive the washer;

Fig. 4 is a bottom plan view of one form of nut used in connection with the invention;

Fig. 5 is a transverse section taken on the line 5—5 of Fig. 1, the nut and bolt omitted;

Fig. 6 is a perspective view of the washer used as a part of the lock;

Fig. 7 is a transverse section taken on the line 7—7 of Fig. 3; and

Fig. 8 is a bottom plan view of a nut for use in connection with the lock and which is slightly different from that shown in Fig. 4.

In the embodiment illustrated an ordinary bolt 1 is shown having the usual head 2 at one end and screw threads 3 at the other. This bolt 1 is shown passed through a piece of timber 4 which has a countersunk seat 5 in its outer face to receive a locking washer 10. This washer 10 and the seat 5 are of the same configuration, being irregular in contour to prevent turning of the washer in the seat, and said seat is here shown provided with a depression 6 extending radially from the opening 8 therein and which is designed for a purpose presently to be described.

The washer 10 is here shown with an elongated portion 11 forming a tail or tongue which is slit longitudinally from the opening 8 through the washer, said slit being cut so that the side walls thereof are inclined in opposite directions as shown in Figs. 5 and 6. This washer 10 is made of spring steel and the portion at one edge of the slit is deflected as shown at 12 in Fig. 5 to form a locking pawl for cooperation with ratchet teeth on the nut 15 as will be presently more fully described. The tongue 11 at the outer end of the slot therein is cut out as shown at 13, one wall of said cut out portion being beveled outwardly as shown at 14 and the other beveled inwardly as shown at 15 which is designed to receive a screw driver or other tool to permit the deflected pawl 12 to be bent downwardly into the recess 6 in the timber 4 to relieve said pawl from locking engagement with the nut 16.

The nut 15 shown in Fig. 4 has two diametrically opposite ratchet teeth 16 while the one 15ª shown in Fig. 8 has four of such teeth.

In the use of this lock the bolt 1 is inserted through the articles to be secured thereby, one of which has the seat 5 in its outer face and the washer 10 is then placed on the threaded end of the bolt in the seat 5 with the pawl 12 extended outwardly ready for engagement with the ratchet teeth 16 of the nut 15 which is screwed down on the bolt and as it is turned the spring pawl 12 is depressed until it reaches one of the grooves forming the teeth 16 when it will spring into engagement with said tooth and thus lock the nut against turning in opposite direction.

When it is desired to remove the nut a screw driver or other implement is placed in the notch or opening 13 with one end engaged under the lip 15 and the other bearing down on pawl 12 until said pawl is released from the tooth of the nut with which it is engaged, the depression 6 in the member 4 permitting this. After being so released it is obvious that the nut 15 may be readily turned off.

The nut 15ª shown in Fig. 8 is the same as that shown in Fig. 4 except that instead of having two teeth or grooves it has four and obviously it may have more or less as desired.

I claim:—

In a nut lock the combination with an object to be secured having a bolt hole therein with a seat of irregular contour surrounding said hole in one face of said object, a spring metal washer shaped to fit in said seat and having a radially split portion with one edge deflected to form a pawl, the outer ends of said split portion having one wall beveled in one direction and the other in the opposite direction to provide for the insertion of a tool to depress the pawl, and a nut having ratchet teeth on its inner face for engagement by said pawl.

In testimony that I claim the foregoing as my own I have hereto affixed my signature in the presence of two witnesses.

ED S. WALLEN.

Witnesses:
  KATHERINE PRICE,
  R. G. DEY.